United States Patent [19]

Cagle

[11] Patent Number: 4,711,124

[45] Date of Patent: Dec. 8, 1987

[54] TORQUE APPLIER

[75] Inventor: Philip V. Cagle, Plainfield, Ind.

[73] Assignee: General Motors Corporation, Detroit, Mich.

[21] Appl. No.: 843,495

[22] Filed: Mar. 24, 1986

[51] Int. Cl.$^4$ .......................................... G01M 13/02
[52] U.S. Cl. ................................................... 73/162
[58] Field of Search ................... 73/118.1, 119 R, 116, 73/162

[56] References Cited

U.S. PATENT DOCUMENTS

| 2,981,103 | 4/1961 | Livezey | 73/118 |
|---|---|---|---|
| 3,078,711 | 2/1963 | Shutt | 73/162 |
| 3,100,991 | 8/1963 | Shipley | 73/162 |
| 3,680,373 | 8/1972 | Kearfott | 73/162 |
| 3,913,394 | 10/1975 | Niehaus | 73/118 |
| 4,040,249 | 8/1977 | Kahle et al. | 165/8 |
| 4,159,642 | 7/1979 | Hudson et al. | 73/118 |

FOREIGN PATENT DOCUMENTS 0926553  5/1982  U.S.S.R. ................. 73/162

OTHER PUBLICATIONS

12 Ways to Load-Test Gears—Gene Shipley—pp. 201/206.
Hardware for Testing Gear Transmissions—Donald J. Fessett, Machine Design, Aug. 7, 1975, pp. 80-82.
Rotac Fluid Power Rotary Actuators—Sales Brochure of Ex-Cell-O Corp., Micro-Precision Operators—pp. 22/23.

Primary Examiner—Stewart J. Levy
Assistant Examiner—Robert R. Raevis
Attorney, Agent, or Firm—Saul Schwartz

[57] ABSTRACT

A torque applier for use in endurance testing a planetary differential aircraft propulsion gear box of the type having a pair of coaxial output shafts and a colinear input shaft wherein the test system also includes an identical slave gear box arranged nose-to-nose with the test gear box with output shafts of the test and the slave gear boxes connected for unitary rotation. The torque applier is disposed between the test gear box and a prime mover and permits straight-through connection to the test gear box input shaft. A pair of rotary actuators are mounted on the torque applier housing and are connected through combining gears to each of the test and slave gear box input shafts and apply opposite torsional moments to the input shafts while the shafts rotate thereby to simulate operational torque transfer through the test gear box.

3 Claims, 2 Drawing Figures

TORQUE APPLIER

BACKGROUND OF THE INVENTION

1. Field of the Invention

This invention relates generally to systems for endurance testing aircraft propulsion system gear boxes and, more particularly, to a torque applier for simulating torque transfer through the gear box.

2. Description of the Prior Art

In a recently proposed aircraft propulsion system, a turboshaft gas turbine engine in the 10,000 horsepower (Hp) category is mounted on the airframe and drives counter-rotating bladed elements, sometimes referred to as propfans or unducted fans, through a planetary differential gear box which divides the engine power between the bladed elements. The gear box has oppositely rotating, coaxial output shafts connected to the bladed members and to two elements of a high capacity planetary differential within the gear box. The gear box also has an input shaft aligned on the same axis as the output shafts and connected to the turbine engine and to the third element of the planetary differential. Preproduction endurance testing of such gear boxes in controlled environments can be performed by placing the gear box between a power source capable of developing high torque corresponding to rated engine power at rated input shaft speeds of about 10,000 RPM and a power absorption device capable of dissipating rated power. Another known approach is to rotate the input shaft at rated speed while simulating rated gear tooth and bearing loads through a recirculating torque system including the test transmission, a slave transmission of like speed and torque ratio having its output shafts connected to the output shafts of the test transmission, and a rotary actuator between the input shafts of the test and slave transmissions capable of applying opposite torsional moments to the input shafts as they rotate. However, the coaxial and colinear arrangement of the input and output shafts, together with the mechanical considerations associated with simulating 10,000 Hp power-flow at input shaft speeds in excess of 10,000 RPM, represents a significant engineering challenge. A torque applier according to this invention, in a torque recirculation test environment, uses a relatively low power prime mover to rotate the test gear box planetary differential at rated speeds and also uses commercially available rotary actuators of relatively low capacity, all in a simple and compact structure.

SUMMARY OF THE INVENTION

Accordingly, the primary feature of this invention is that it provides a new and improved torque applier in a torque recirculation test system for an aircraft propulsion gear box having concentric, oppositely rotating output shafts and a colinear input shaft, the test system further including a slave gear box, rigid connections between the output shafts of the test and slave gear boxes, and connections between the input shafts of the test and slave gear boxes and the new and improved torque applier. Other features of this invention reside in the provision in the new and improved torque applier of a fixed housing rotatably supporting a main shaft between the prime mover and the test gear box input shaft, a pair of pinion gears in the housing rotatable as units with respective ones of the test and slave gear box input shafts, a corresponding plurality of driven gears on the housing meshing with the pinions in speed reduction/- torque multiplication fashion, and at least one rotary actuator on the housing having a first actuator shaft connected to one of the driven gears and a second actuator shaft connected to the other of the driven gears, the pinion gears and the driven gears cooperating to multiply the torque developed by the rotary actuator while reducing the rotary speed experienced by the actuator shafts. Still another and more specific feature of this invention resides in the provision in the new and improved torque applier of a plurality of rotary actuators disposed in a circumferential array around the pinion gears whereby the torque developed by the individual rotary actuators is easily combined without excessive additional space requirements. And still further and more specific features of this invention reside in the provision in the new and improved torque applier of a plurality of rotary actuators on the housing having actuator shafts rotatable about axes of the housing parallel to the axis of the main shaft and in the provision of driven gears in planes perpendicular to the main shaft axis between the pinions and the actuator shafts, the arrangement of the driven gears in planes perpendicular to the axis of the main shaft permitting multiple driven gears to mesh with each pinion so that the torsional moments developed by each of the multiple rotary actuators on the housing are combined.

BRIEF DESCRIPTION OF THE DRAWINGS

These and other features of this invention will be readily apparent from the following specification and from the drawings wherein.

DESCRIPTION OF THE PREFERRED EMBODIMENT

Figure 1:
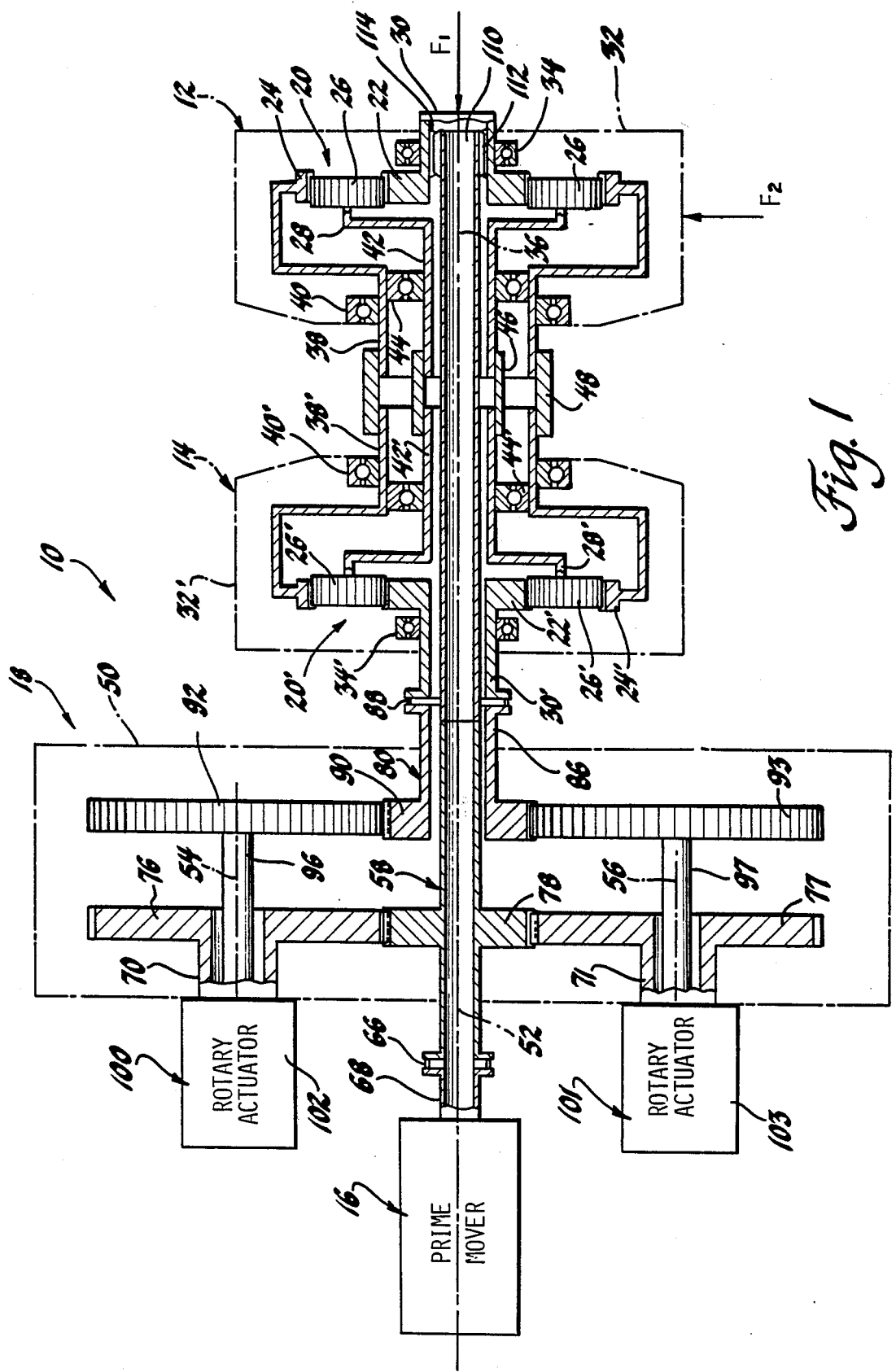
FIG. 1 is a schematic representation of an aircraft propulsion gear box endurance testing system including a torque applier according to this invention.

Referring now to FIG. 1 of the drawings, a schematically illustrated test system 10 includes a test gear box 12, a slave gear box 14, a prime mover 16 and a torque applier 18 according to this invention. The test gear box 12 includes a single planetary gear set 20 consisting of a sun gear 22, a ring gear 24 and a plurality of planet gears 26 rotatably supported on a carrier 28. The sun gear 22 is rigidly attached to a tubular sun gear shaft 30 representing the test gear box input shaft. The shaft 30 is supported on a housing 32 of the test gear box by a schematically illustrated bearing 34 for rotation about a main axis 36 of the test gear box. A tubular ring gear shaft 38 representing one output shaft of the test gear box is supported on the housing 32 for rotation about the axis 36 by another schematically illustrated bearing 40 and is rigidly connected to the ring gear 24. A tubular carrier shaft 42 representing the other output shaft of the test gear box is connected to the carrier 28 and disposed within the ring gear shaft 38. The shaft 42 is supported for rotation about the axis 36 by a schematically illustrated bearing 44 between the shaft 42 and the shaft 38.

The slave gear box 14 is identical to the test gear box 12 and is arranged relative to the latter in mirror image or nose-to-nose fashion. More particularly, and identifying the elements of the slave gear box 14 with the same reference characters applied to the corresponding elements of the test gear box 12 but primed to denote the slave gear box, the slave gear box includes a single planetary gear set 20' consisting of a sun gear 22', a ring gear 24' and a plurality of planet gears 26' on a carrier 28'. Tubular sun gear, ring gear and carrier shafts 30', 38' and 42', respectively, are connected to the sun gear, the ring gear and the planet carrier and rotatably supported on a housing 32' of the slave gear box by schematically illustrated bearings 34', 40' and 44'. The slave gear box 14 is supported on a test stand, not shown, in alignment with the test gear box 12 such that the main axis of the slave gear box, not specifically identified, is colinear with the main axis 36 of the test gear box 12.

A first sleeve 46 rigidly couples the carrier shafts 42 and 42' of the test and slave gear boxes, respectively, and a second sleeve 48 rigidly connects the ring gear shafts 38 and 38'. Accordingly, rotation of the sun gear shaft 30 of the test gear box 12 effects simultaneous rotation of the sun gear shaft 30' of the slave gear box 14 in the same direction and at the same speed. Conversely, if one of the sun gear shafts 30 and 30' is held fixed while a torsional moment is applied to the other, the gears and bearings of the planetary gear sets 20 and 20' are stressed in a simulated torque transmission mode.

Figure 2:
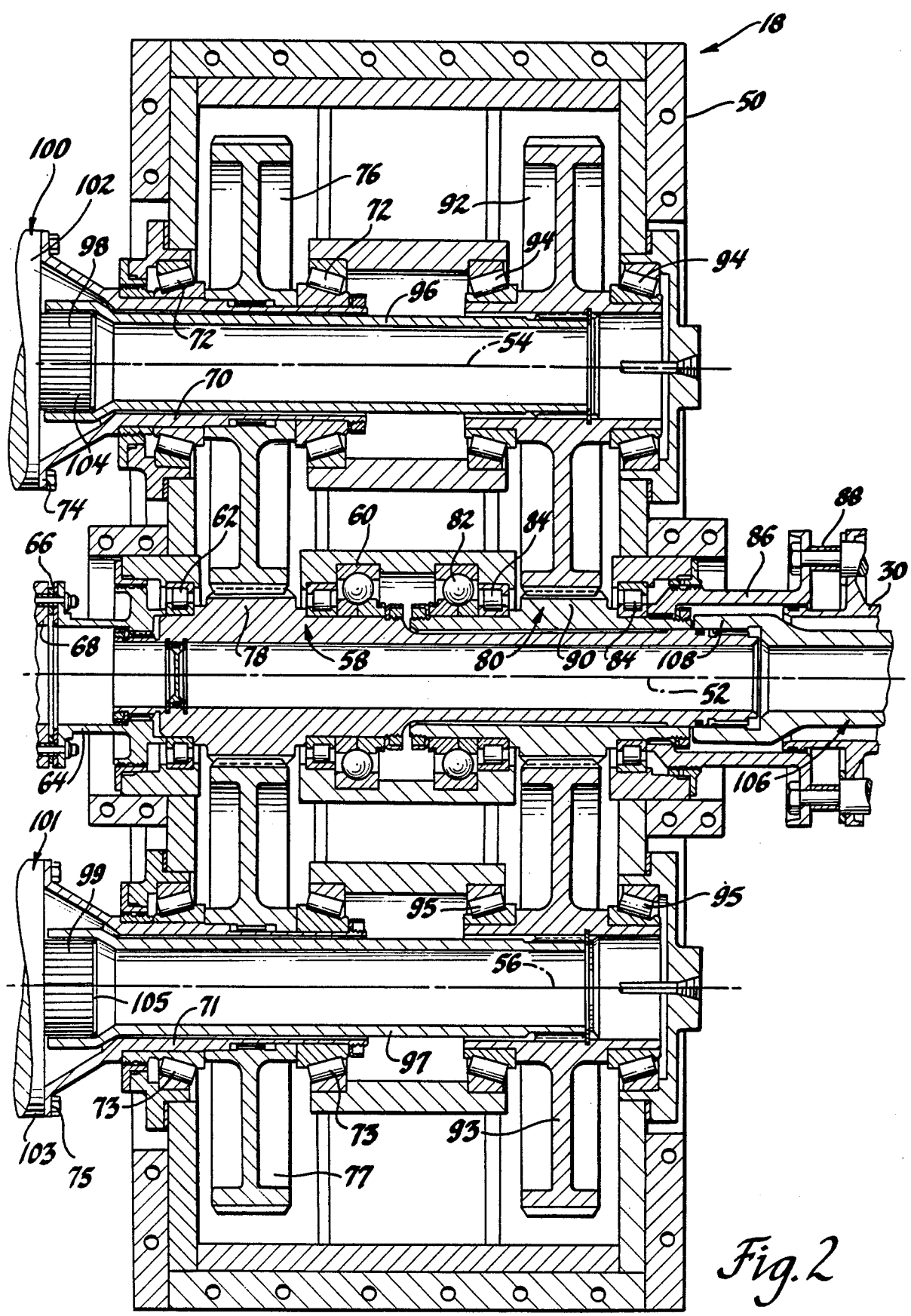
FIG. 2 is an enlarged sectional view, in plan, of the torque applier according to this invention.

Referring now to FIGS. 1 and 2, the torque applier 18 is mounted on the fixed support between the slave gear box 14 and the prime mover 16 and includes a housing 50 defining a main axis 52 and a pair of satellite axes 54 and 56 parallel to and equidistant from the main axis 52. In the preferred embodiment, the main axis 52 and the satellite axes 54 and 56 are disposed in a common horizontal plane of the torque applier. A tubular torque applier main shaft 58 is supported on the housing 50 for rotation about the main axis 52 by a ball bearing 60 and a roller bearing 62. The main shaft 58 is drive connected to the prime mover through a collar 64 spline connected to the main shaft and a coupling 66 between the collar 64 and an output shaft 68 of the prime mover 16.

The torque applier 18 further includes a pair of outer tubular actuator shafts 70 and 71 supported on the housing 50 for rotation about satellite axes 54 and 56, respectively, by two pairs of roller bearings 72 and 73. Each outer tubular shaft 70 and 71 has a flange 74 and 75, respectively, at an end thereof outboard of the housing 50. A pair of driven spur gears 76 and 77 are supported on corresponding ones of the outer tubular shafts 70 and 71 for rotation as units therewith. Each of the driven gears 76 and 77 meshes with a first pinion gear 78 integral with the main shaft 58. Accordingly, the outer tubular shafts 70 and 71 rotate in the same direction and at the same speed whenever the main shaft 58 rotates.

As seen best in FIG. 2, an intermediate tubular shaft 80 is supported on the housing 50 for rotation about the main axis 52 by a ball bearing 82 and by a pair of spaced roller bearings 84. The intermediate tubular shaft 80 is connected to the sun gear shaft 30' of the slave gear box 14 through a collar 86 spline connected to the tubular intermediate shaft outboard of the roller bearings 84 and a coupling 88 between the collar 86 and the sun gear shaft 30'. A second pinion gear 90 formed integrally with the intermediate tubular shaft 80 meshes with each of a pair of driven spur gears 92 and 93 supported on the housing 50 for rotation about the satellite axes 54 and 56, respectively, by corresponding pairs of roller bearings 94 and 95.

A pair of inner tubular actuator shafts 96 and 97 are disposed within corresponding ones of the outer tubular actuator shafts 70 and 71 with spline connections at one end to the driven gears 92 and 93, respectively. The distal ends of the inner tubular actuator shafts 96 and 97 project outboard of the housing 50 within the confines of the outer tubular actuator shafts and each includes a plurality of internal splines 98 and 99. The first pinion gear 78 is identical to the second pinion gear 90 and the driven gears 76, 77, 92 and 93 are identical to each other. Accordingly, when the main shaft 58 and the tubular intermediate shaft 80 rotate about the main axis 52 in the same direction and at the same speed, the inner tubular actuator shafts 96 and 97 and the outer tubular actuator shafts 70 and 71 rotate at the same speed and in the same direction.

The torque applier 18 further includes a pair of commercially available rotary actuators 100 and 101 disposed between respective pairs of inner and outer actuator shafts 70,96 and 71,97. Rotary actuators commercially available under the trade name "Rotac" from Ex-Cell-O Corporation, Microprecision Operations, 525 Berne Street, Berne, Ind. 46711 are preferred. The rotary actuators 100 and 101 include schematically represented outer cases 102 and 103 and schematically represented center shafts 104 and 105. The housings 102 and 103 are bolted to the flanges 74 and 75 of the outer tubular actuator shafts 70 and 71 and rotate as units therewith. The center shafts 104 and 105 include external splines which engage the internal splines 98 and 99 on the inner tubular actuator shafts 96 and 97 thereby coupling the center shafts of the rotary actuators and the inner tubular actuator shafts for unitary rotation. The rotary actuators 100 and 101 include internal structure, not shown, operative to generate or develop opposite torsional moments on the pairs of inner and outer tubular actuator shafts 96,70 and 97,71 as the shafts rotate together proportional in magnitude to a hydraulic pressure supplied to the rotary actuators.

A tubular main shaft extension 106 is aligned on the coincident main axes of the test and slave gear boxes 12 and 14 and the torque applier 18 and includes a torque applier end 108 and a gear box end 110. At the torque applier end 108, the extension 106 includes a plurality of internal splines which engage a corresponding plurality of external splines on the torque applier main shaft 58 whereby the two shafts are rotatable as a unit by the prime mover 16. At the gear box end 110, the extension 106 includes a plurality of external splines 112, FIG. 1, engaging a corresponding plurality of internal splines 114 on the sun gear shaft 30 whereby the sun gear shaft and the sun gear 22 are rotatable by the prime mover 16. In addition, a torque path is defined between the inner tubular actuator shafts 96 and 97 and the outer tubular actuator shafts 70 and 71 through the driven gears 76 and 77, the first pinion 78 and the shafts 58 and 106, the planetary gear sets 20 and 20', the shaft 80, the second pinion 90, and the driven gears 92 and 93. Accordingly, the rotary actuators 100 and 101, when hydraulically pressurized, urge the sun gear shafts 30 and 30' in opposite directions thereby loading the gear teeth and bearings of the planetary gear sets 20 and 20' in a simulated torque transfer mode. The degree of torque transfer simulation by the rotary actuators 100 and 101 is independent of the speed of rotation of the output shaft 68 of the prime mover because the rotary actuators rotate as units with corresponding pairs of tubular actuator shafts 70,96 and 71,97.

The torque applier 18 is particularly suited for testing high speed, high horsepower aircraft propulsion gear boxes because it provides the capability, in a convenient in-line system, of summing the outputs of a plurality of commercially available rotary actuators which are typically employed in lower speed applications and are individually incapable of developing the necessary torque to simulate transfer of rated aircraft propulsion horsepower. In the test system 10, for example, the test gear box 12 has a horsepower rating in excess of 10,000 Hp at 10,000 RPM input speed to the sun gear shaft 30. In operation, with the test gear box 12, the slave gear box 14 and the torque applier 18 mounted on a suitable platform with the main axes of the gear boxes and the torque applier coincident, the prime mover 16 provides rotary power sufficient only to overcome the frictional and windage losses within the gear boxes and the torque applier at a speed corresponding to the rated speed of the test gear box 12. For example, where the horsepower ratings of the test gear box is about 10,000 Hp, the prime mover 16 need be capable of supplying only about 10 percent or 1,000 Hp to overcome losses within the gear boxes. With the rotary actuators 100 and 101 inactive, the prime mover 16 rotates the sun gear shaft 30 at rated input speed, about 10,000 RPM, providing output rotation of the sun gear shaft 30' of the slave gear box 14 at the same speed and in the same direction. Accordingly, both the first and second pinion gears 78 and 90 in the torque applier 18 rotate at the same speed and in the same direction. The first and second pinions, meshing simultaneously with each of the driven gear pairs 76, 77 and 92, 93, rotate each of the inner and outer tubular actuator shafts 70, 71 and 96, 97 in the same direction and at the same speeds. The speeds of the tubular actuator shafts, however, are less than the speeds of the first and second pinions by amounts proportional to the gear ratio between the pinions and driven gears.

With the tubular actuator shafts thus rotating, hydraulic pressure is applied to the rotary actuators 100 and 101 which then impart opposite torsional moments to the tubular actuator shafts corresponding in magnitude to the pressure supplied. The oppositely directed torsional moments on the tubular actuator shafts operate through the driven gears and the first and second pinion gears to simulate torque transfer through the planetary gear sets 20 and 20' of the test and slave gear boxes 12 and 14. The torsional moments applied by each of the rotary actuators 100 and 101 are summed or added together through simultaneous meshing of each of the driven gears 76, 77 with the first pinion 78 and each of the driven gears 92, 93 with the second pinion gear 90 so that in the embodiment illustrated, the rotary actuators 100, 101 need only be capable of supplying about one-half of the torsional moment required to simulate transfer of 10,000 Hp through the test gear box 12. In addition, if desired, the mounting facility for the test gear box 12 may be adapted to apply loads identified as F1 and F2 in FIG. 1 which simulate external aircraft operating loads such as prop loads and moments.

The embodiments of the invention in which an exclusive property or privilege is claimed are defined as follows:

1. In an endurance test system for a test gear box of predetermined rated horsepower capacity at a rated input speed having a pair of concentric output shafts and a colinear input shaft,
    said test system including a slave gear box having a pair of concentric output shafts aligned with and connected to respective ones of said test gear box output shafts for rotation as units therewith and a colinear input shaft,
    rotation of said test gear box input shaft effecting concurrent rotation of said slave gear box input shaft in the same direction and at the same speed and oppositely directed torsional moments on said test gear box input shaft and said slave gear box input shaft simulating torque transfer through said test gear box, and
    a prime mover having a horsepower rating not exceeding about ten percent of said test gear box rated horsepower and a power shaft aligned with said test gear box input shaft and said slave gear box input shaft and rotatable at said test gear box rated input speed,
    a torque applier comprising:
    a torque applier housing disposed between said prime mover and said test gear box and defining a main axis,
    a torque applier main shaft means aligned on said main axis and extending through said torque applier housing drivingly connecting said prime mover power shaft and said test gear box input shaft whereby said test gear box input shaft is rotated at said rated input speed,
    an intermediate shaft means on said housing rotatable about said main axis,
    means connecting said intermediate shaft means and said slave gear box input shaft for unitary rotation,
    a plurality of rotary actuators each having a housing and a center shaft interconnected by means operative to develop equal and opposite torsional moments between
    respective pairs of said housings and said center shafts while said housings and said center shafts rotate in the same direction at the same speed,
    means mounting each of said rotary actuators on said torque applier housing in a circumferential array around said main axis,
    first combining gear means within said torque applier housing between said main shaft means and each of said rotary actuator housings rotating each of said rotary actuator housings at a reduced speed relative to said main shaft means, and
    second combining gear means on said torque applier housing between said intermediate shaft means and each of said rotary actuator center shafts rotating each of said rotary actuator center shafts at the same speed as said rotary actuator housings and in the same direction,
    said first and said second combining gear means simultaneoulsy multiplying and summing the torsional moments developed by each of said rotary actuators while said test and said slave gear box input shafts rotate thereby to simulate torque transfer through said test gear box at said rated input shaft speed.

2. The torque applier recited in claim 1 wherein said torque applier housing includes
    means defining a pair of satellite axes on said torque applier housing parallel to and equidistant from said torque applier main axis, and said plurality of rotary actuators includes
    two rotary actuators disposed on said torque applier housing such that said housing and said center shaft of one of said two rotary actuators are rotatable about one of said satellite axes and said housing and said center shaft of the other of said two rotary actuators are rotatable about the other of said satellite axes.

3. The torque applier recited in claim 2 wherein said first combining gear means includes
- a first pinion disposed within said torque applier housing for rotation as a unit with said torque applier main shaft means,
- a first pair of identical driven gears larger than said first pinion gear,
- means mounting each of said first pair of driven gears within said torque applier housing for rotation about respective ones of said pair of satellite axes and in meshing engagement with said first pinion,
- means connecting each of said first pair of driven gears to a corresponding one of said two rotary actuator housings for rotation as a unit therewith, and said second combining gear means includes
- a second pinion identical to said first pinion and disposed within said torque applier housing for rotation as a unit with said torque applier intermediate shaft means,
- a second pair of identical driven gears identical to said first pair of driven gears,
- means mounting each of said second pair of driven gears within said torque applier housing for rotation about respective ones of said pair of satellite axes and in meshing engagement with said second pinion, and
- means connecting each of said second pair of driven gears to a corresponding one of said two rotary actuator center shafts for rotation as a unit therewith.

* * * * *